United States Patent
Potter, IV et al.

(10) Patent No.: US 7,464,297 B2
(45) Date of Patent: Dec. 9, 2008

(54) SYSTEM AND METHOD FOR TESTING SOFTWARE USING DATA-DRIVEN TEST VARIATIONS

(75) Inventors: Orville Jay Potter, IV, Seattle, WA (US); Michael Robinson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 513 days.

(21) Appl. No.: 11/165,765

(22) Filed: Jun. 23, 2005

(65) Prior Publication Data

US 2006/0291398 A1   Dec. 28, 2006

(51) Int. Cl.
 *G06F 11/00* (2006.01)
(52) U.S. Cl. .............. 714/38; 714/26; 714/27; 714/28
(58) Field of Classification Search .......... 714/26, 714/27, 28, 38
See application file for complete search history.

(56) References Cited

U.S. PATENT DOCUMENTS 6,353,897 B1 *   3/2002   Nock et al. ............ 714/38
7,305,659 B2 *  12/2007   Muller et al. ........ 717/127

* cited by examiner

*Primary Examiner*—Robert Beausoliel
*Assistant Examiner*—Charles Ehne
(74) *Attorney, Agent, or Firm*—Merchant & Gould, P.C.

(57) ABSTRACT

The integrated test framework of the present invention includes a test framework runtime that executes test scripts and that also allows a script to identify a variation tool called a "data provider" that is responsible for providing data to the test framework runtime and controlling the iteration of the runtime through the variations. The script also identifies the type of data set from which the data provider should obtain the data from which the variations are derived and the location of the data set. Multiple variation data providers may be used in conjunction with an adapter layer that coordinates the iteration of each variation data provider and creates an aggregated variation over multiple varying parameters of different scope.

20 Claims, 11 Drawing Sheets

```xml
<?xml version="1.0"?>
<TestData xmlns:xsi="http://www.w3.org/2001/XMLSchema-instance" xmlns:xsd="http://www.w3.org/2001/XMLSchema">
  <DataProviders>
    <DataProvider Description="" AssemblyQualifiedName="MS.Internal.Test.Automation.Office.Runtime.TestSuiteData,..." >
  <TestSuites>
    <TestSuite Version="1.0" UserDescription="-Edit Description-" SuiteId="28044e6c-9162-4160-8618-02a900c5710d">
      <DataProviders>
        <DataProvider Description="" AssemblyQualifiedName="MS.Internal.Test.Automation.Office.Runtime.TestClassData,..." >
          <TestClassData xmlns:xsi="http://www.w3.org/2001/XMLSchema-instance" xmlns:xsd="http://www.w3.org/2001/XMLSchema">
          <TestClasses>
            <TestClass Version="1.0" UserDescription="" AssemblyQualifiedName="MS.Internal.Test.Automation.Office.Tests.IntegrationTest,..."
Enabled="true">
              <DataProviders>
                <DataProvider Description="" AssemblyQualifiedName="MS.Internal.Test.Automation.Office.Runtime.Variations.VariationDataSet,..." >
                  <VariationDataSet Version="1.0" Description="Data: Embedded - NewDataSet Xml file (using FileDepot) - MyDataSet.xml Iterator: Serial">
                    <DataSets>
                      <DataSet Description=""
AssemblyQualifiedName="MS.Internal.Test.Automation.Office.Runtime.Variations.EmbeddedXmlDataSetProvider,..." >
                        <EmbeddedXmlDataSetProvider xmlns:xsi="http://www.w3.org/2001/XMLSchema-instance" xmlns:xsd="http://www.w3.org/2001/
XMLSchema">
                          ...
                        </EmbeddedXmlDataSetProvider>
                      </DataSet>
                      <DataSet Description=""
AssemblyQualifiedName="MS.Internal.Test.Automation.Office.Runtime.Variations.FileDepotXmlDataSetProvider,..." >
                        <FileDepotXmlDataSetProvider>
                          <FileName>//depot/project/datafiles/mydataset.xml</FileName>
                        </FileDepotXmlDataSetProvider>
                      </DataSet>
                    </DataSets>
                    <DataSetIterator AssemblyQualifiedName="MS.Internal.Test.Automation.Office.Runtime.Variations.SerialDataSetIterator,..." >
                      <SerialDataSetIterator/>
                    </DataSetIterator>
                  </VariationDataSet>
                </DataProvider>
```

FIG. 4a

```
<DataProvider Description="" AssemblyQualifiedName="MS.Internal.Test.Automation.Office.Runtime.TestMethodData, ...">
  <TestMethodData>
    <TestMethods>
      <TestMethod Version="1.0" UserDescription="" Signature="Void DataMethod2(System.String, System.String)" Enabled="true">
      <DataProviders>
        <DataProvider Description=""
AssemblyQualifiedName="MS.Internal.Test.Automation.Office.Runtime.Variations.VariationDataSet,...">
          <VariationDataSet Version="1.0" Description="Data: Xml file (using FileDepot) -- MyMethodData.xml Iterator: Parallel">
            <DataSets>
              <DataSet Description=""
AssemblyQualifiedName="MS.Internal.Test.Automation.Office.Runtime.Variations.FileDepotXmlDataSetProvider,...">
                <FileDepotXmlDataSetProvider>
                  <FileName>//depot/project/datafiles/mymethoddata.xml</FileName>
                </FileDepotXmlDataSetProvider >
              </DataSet>
            </DataSets>
            <DataSetIterator AssemblyQualifiedName="MS.Internal.Test.Automation.Office.Runtime.Variations.ParallelIDataSetIterator,...">
              <ParallelDataSetIterator/>
            </DataSetIterator>
          </VariationDataSet>
        </DataProvider>
```

```xml
</DataProviders>
  </TestMethod>
 </TestMethods>
 <TestMethodData>
  <DataProvider>
  </DataProviders>
 </TestClass>
</TestClasses>
</TestClassData>
</DataProvider>
<DataProvider Description="" AssemblyQualifiedName="MS.Internal.Test.Automation.Office.FileDepot.FileDepotAssemblyData,...">
 <AssemblyData>
  <Assemblies>
   <Assembly>//builttestcasefiles/motiftest/ms.internal.test.automation.office.tests.integrationtest.dll</Assembly>
  </Assemblies>
  <Dependencies />
 </AssemblyData>
 <DataProvider>
</DataProviders>
<TestSuite>
</TestSuites>
</TestSuiteData>
</DataProvider>
</DataProviders>
</TestData>
```

FIG. 4c

```
[TestMethod]
public void MyTestCase([Context("x")]string x,
[Context("y")]string y)
{
    Log.Comment("x - " + x);
    Log.Comment("y - " + y);
    Log.Pass("MyTestCase");
}
```

FIG. 5a

```
[Test NameSpace],[TestClass];x,[TestClass];y
Iteration 1,24,Ivory Tower
Iteration 2,232,Foundation
Iteration 3,-124,Zanzibar
```

FIG. 5b

<Class setup>

[TestMethod] void MyTestCase(System.String, System.String)
   x – 24
   y – Ivory Tower
   Pass – MyTestCase

[TestMethod] void MyTestCase(System.String, System.String)
   x – 232
   y – Foundation
   Pass – MyTestCase

[TestMethod] void MyTestCase(System.String, System.String)
   x – -124
   y – Zanzibar
   Pass – MyTestCase <Class teardown>

FIG. 5c

SYSTEM AND METHOD FOR TESTING SOFTWARE USING DATA-DRIVEN TEST VARIATIONS

TECHNICAL FIELD

This application relates generally to the testing of software and more particularly to a system and method for testing software using data-driven test variations.

BACKGROUND OF THE INVENTION

Software, such as programs or applications, is tested many times before being released to the public to ensure proper operation. The most common test performed on software is a simple text to verify that some functionality is operable. For example, after each substantial revision in the development to determine if the changes in the new version might have detrimentally affected the operation of the software due to unanticipated conflicts or errors. If a problem, such as an error or exception occurring during the execution of a scenario, is found during a test, software testers may utilize a number of testing tools to evaluate the step-by-step performance of software and to identify the source of the problem.

Software testing requires the tester to develop a test in which the tester identifies what operational test scenario the target software should perform, i.e. the defined the sequence of actions the software will take during the test. The software testing process typically requires the tester to write a test script that, at a minimum, identifies the software to be tested and the test scenario to be tested. Additionally, the test script typically configures the computer and target software to a specific starting point and directs the test results to a specific location.

In addition to this, test scripts are typically testing tool specific in that each testing tool has its own format for defining a scenario. Thus, in order to test a particular scenario with multiple tools, as may occur when the source of problem is difficult to identify, a tester must have knowledge of the specific scenario definition requirements for each testing tool and must recreate the test scenario for each tool.

After it has been created, a test script is then executed, such as by a software testing tool or application, which causes the target application (i.e., the software being tested) to perform the actions identified in the test scenario in the test script. The results of the test are then inspected by the tester to determine if additional testing is needed, if the test failed to investigate the source of the failure, or if the tested software has passed the test.

Testing software is a tedious process because often a test must be repeated for many different test scenarios. For example, a simple test scenario for an office productivity application may consist of a) opening a document of a first type, b) saving the document as a second type, and c) closing the application. Such a test scenario is designed to find problems in the "Save As" functionality of the application and verify that each file type is supported by the "Save As" function in the application. Another simple test scenario related to the "Save As" functionality may consist of a) opening a document, b) changing the document's name to a predetermined name, and c) saving the document. This test scenario may be used to test various file names to verify that the application does not generate errors when long file names or file names with special characters are used.

Typically, these simple tests would be repeated many times with only slight variations in the test scenario. For instance, in the above examples the first test scenario may be repeated for each file type that the application supports in its "Save As" menu command and the second test scenario may be repeated for a predetermined set of specific file names designed to test the limits of the software's name support.

A tester confronted with the task of performing tests with multiple variations like the examples described above typically would create multiple test scripts, one for each document type or file name to be tested. Alternatively, the tester could create one script that was written to interface with a data file that identified each document type or each file name and caused the test to be run iteratively until the test had been repeated for each entry in the data file.

The drawbacks of these methods of testing different, but similar, scenarios are many. In particular, the separate script method has the drawback that it is very time intensive. The amount of time spent in writing, executing, and then reviewing the output generated by each test script is incredible; more so considering that each test includes completely reconfiguring the test computer each time and that the outputs are often located in separate files which must be separately opened and evaluated. Some of the drawbacks of using a single script to iterate through a separate data file are that the testing tool may not return the test environment to a known state after each iteration or that an error may corrupt the test environment: each case essentially rendering the results of all subsequent iterations valueless or at least suspect.

SUMMARY OF THE INVENTION

In accordance with the present invention, the above and other problems are solved by the integrated test framework of the present invention. The integrated test framework includes a test framework runtime that executes test scripts and that also allows a script to identify a variation tool called a "data provider" that is responsible for providing data to the test framework runtime and controlling the iteration of the runtime through the variations. The script also identifies the type of data set from which the data provider should derive the variations and the location of the data set, if the data set is external to the test script.

In accordance with other aspects, the present invention relates to a system for testing a software application. The system includes a processor and a testing runtime executing on the processor, the testing runtime directing the software application to perform operations based on a test definition and storing results related to performance of operations of the software application. At least one variation data provider identified by the test definition and executing on the processor is included. The variation data provider generates a plurality of variations from a template, the template being a set of operations including a parameter and each variation being the template set of operations using a different value for the parameter. In addition, the variation data provider supplies the plurality of variations to the testing runtime.

In accordance with still other aspects, the present invention relates to a method of testing software with a testing runtime. The method includes initializing the software to be tested on a computer system and also initializing a first variation data provider and a second variation data provider and an adapter layer. The scope of each variation data provider is identified to the adapter layer. After initialization a testing runtime requests from the adapter layer, a variation comprising at least one operation to be performed by the software. In response, the testing runtime receives a variation from the adapter layer, the variation including an initial configuration for the software and a set of one or more operations, wherein a first value in the set of one or more operations is provided by the first variation data provider and a second value in the set of one or more operations is provided by the second variation data provider. The response may also include a revert command causing the testing runtime to reconfigure the software to the initial configuration. Next, the software is directed to perform the set of one or more operations. The testing runtime then records information describing the performance of the software of the set of one or more operations. These steps are then repeated by the runtime requesting the next variation until the adapter layer returns a no further variation response to a request for a next variation.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 4a, 4b and 4c together illustrate an exemplary test script written in the .XML markup language.

FIGS. 5a and 5b illustrate an exemplary template of operations and corresponding data set.

FIG. 5c illustrates the abridged output generated by executing the template of operations shown in FIG. 5a using the data set in FIG. 5b.

DETAILED DESCRIPTION OF THE INVENTION

Figure 1:
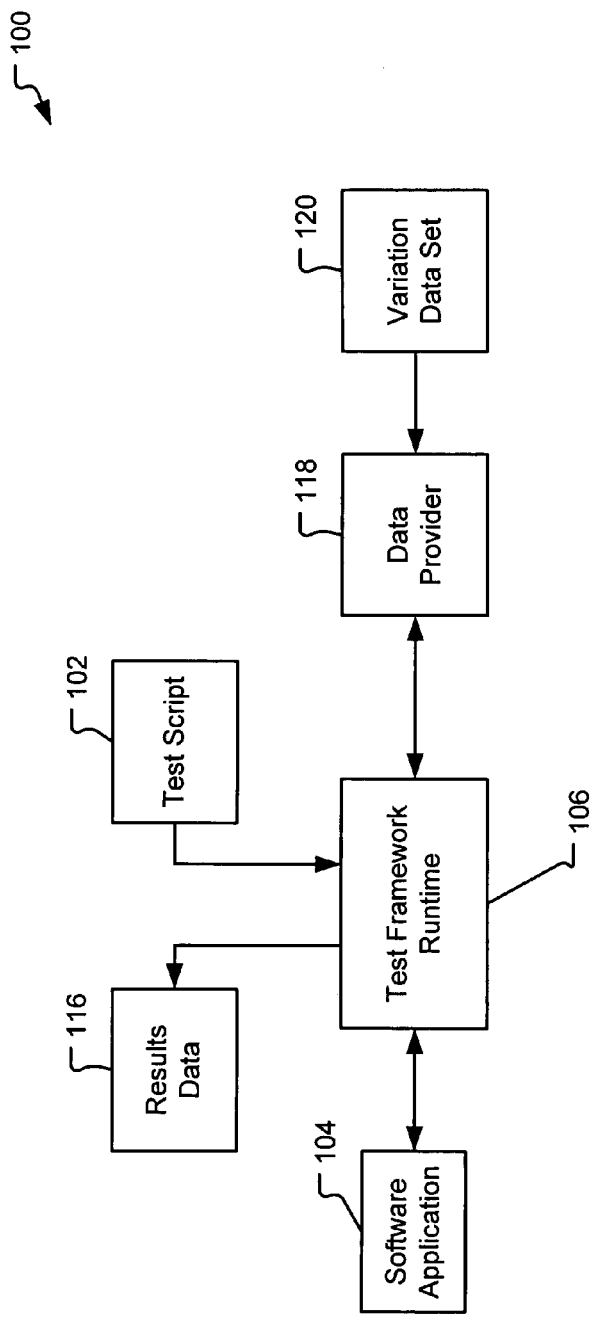
FIG. 1 illustrates, at a high, conceptual level, a computer architecture for testing software applications, the computer architecture including an integrated test framework in accordance with an embodiment of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numbers in the drawings refer to like elements throughout.

In general, embodiments of the present invention may be considered as an integrated test framework that allows software testers to easily generate test scenario variations and execute those variations from a single test script. A "test scenario variation" or simply a "variation" refers to one of a set of nearly identical test scenarios that differ only in the value used for a data parameter (or set of parameters in complex embodiments), such as a file type parameter, a file name parameter, a file location parameter, a font size parameter, a font color parameter, etc.

The integrated test framework of the present invention includes a test framework runtime. The test framework runtime executes test scripts and allows a test script to identify a variation tool called a "data provider." The data provided is responsible for providing data to the test framework runtime and controlling the iteration of the runtime through the variations. The test script identifies the variations to use for the test. The test script may include the data necessary to create the variations for the test or may refer to an external data source to generate the variations from.

FIG. 1 is a high-level, conceptual illustration of a computing architecture 100 for testing software applications in accordance with an embodiment of the present invention. In the embodiment shown, the computer architecture 100 includes an integrated test framework runtime 106. The integrated test framework runtime 106 executes, or otherwise interprets or acts on, a test script 102 that directs the runtime to cause the target software application 104 to perform one or more test scenarios. During execution of the test scenario by the software application 104, the runtime 106 stores results data, such as errors emitted by the target software application 104 in a results data store 116.

The integrated test framework runtime 106 could alternatively be referred to as a "test management application" or a "test manager." The integrated test framework runtime 106 may be considered an independent test manager software application that can configure, register, execute, and may control the operation of the available independent testing tools (not shown). The integrated test framework runtime 106 is referred to herein as a "framework runtime" rather than an application to differentiate it from the target software application 104 being tested and also because in most of the embodiments described the integrated test framework runtime 106 operates in the background, without direct user interaction, for the purpose of managing the operations of testing tools, data providers 118 (discussed below), the computer operating system (not shown), file management, etc., during the execution of the test.

Execution of the test script 102 via the test framework runtime 106 causes the configuration and execution of the software application 104. If the test script identifies a series of operations to be performed by the software application 104, such as open, save as, and close a document scenario, these operations are executed as directed by the test script. Thus, the test script 102 may cause the software application 104 to perform any scenario of interest to the tester. In some embodiments, the software application 104 may need to be modified to allow for control via the test framework runtime 106, a process referred to as "automation" as which is known in the art.

The test script 102, as described above, identifies the target software application 104 to be tested and in the present invention identifies a set of test scenarios that dictate the operation of a target software application 104 during the test. In embodiments of the present invention the test script 102, as will be described in greater detail below, as part of identifying the set of test scenarios identifies at least one variation data provider 118 and a corresponding variation data set 120. The variation data set may be included in test script 102 or may be an external data set 120 or both if more than one data provider 118 is identified.

A variation data provider 118 is a component that may be called by the runtime 106 to cause the runtime 106 to perform multiple tests on the software application 106. A variation data provider 118 includes a list of methods (also referred to as a template of operations) to be performed by the target software application 104. The list of methods may be considered a template because it includes at least one operational parameter that is unspecified, such as for example a file name parameter or font size parameter in addition to listing the methods or operations to be performed. When called by the runtime 106, a variation data provider 118 supplies to the runtime one variation to be executed by the target application 104. The variation is created by obtaining a value from the variation data set 120 that is associated with the parameter in the template and passing the list of methods with that value as the parameter to the runtime 106.

After the runtime 106 executes the variation by causing the software application 104 to perform the operations designated in the variation and records the results, control is returned to the variation data provider 118 to determine if another variation needs to be tested. If another variation is to be tested the variation data provider 118 first causes the runtime 106 to revert the target software application 104 to its original, initial configuration/state and then supplies the runtime 106 with the next variation generated by obtaining the next value associated with the parameter in the template or list of methods. After all variations have been tested, the variation data provider 118 returns a "no further variation response" to the runtime 106 and the runtime continues with the execution of the remaining commands contained in the script 102.

In embodiments using the component object model of programming, the variation data provider 118 may be a particular instantiation, or object, of a variation data provider class. In this embodiment, the variation data provider class may be a subclass, that is it inherits from, the base data provider class that generates or otherwise supplies data to the runtime 106. Thus, the validation data provider 118 can be considered a specialized executable object for generating and supplying variations to the runtime 106. A specific variation data provider instance is created when the variation data provider class is read into memory and supplied with data from a tester-created variation data provider definition file. Likewise, the runtime 106 and the variation data set 120 may also be instantiations of and inherit from a respective base class.

An exemplary component object model embodiment of the present invention is a VariationDataProvider class. VariationDataProvider class is an abstract class that implements an IDataProvider interface. Variation data providers derive from this class and implement the additional abstract methods:

- Apply Variation—which generates the variation and passes it to the testing runtime or adapter layer;
- RevertVariation—resets the configuration of the software application being tested;
- GetNext Variation—reads next value from the variation data set.

The variation data provider 118 includes an identification of a template test scenario from which the variations are created by changing at least one parameter in the template test scenario. The parameters are provided in a variation data set 120 identified by the test script 102. Upon execution of the test script 102 by the runtime 106, the data provider 118 is initialized and linked to the variation data set 120. Each variation is then the template test scenario with the parameter or parameters supplied from the variation data set 120. In a simple embodiment, the variation data set 120 is a comma delimited text (.CSV) file that contains a list of values for each parameter in the template test scenario. In another embodiment, the variation data set 120 actually generates values based on some model or algorithm.

Figure 2:
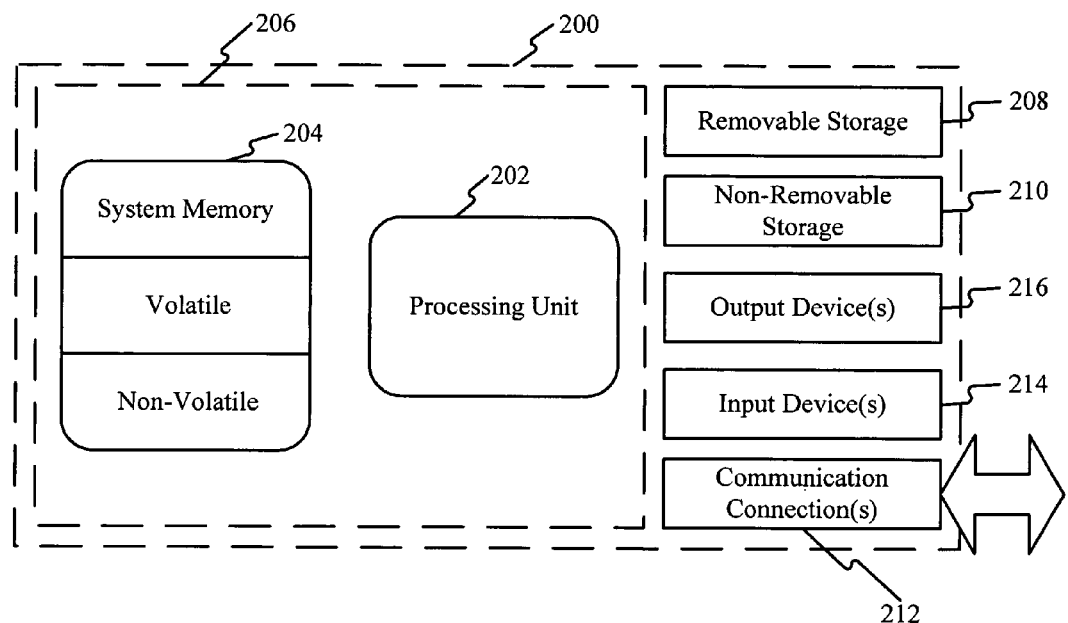
FIG. 2 shows an exemplary computer system upon which embodiments of the present invention may be implemented.

An embodiment of a suitable operating environment in which the present invention may be implemented is shown in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary computing environment for implementing the embodiments of the present invention includes a computing device, such as computing device 200. In its most basic configuration, computing device 200 typically includes at least one processing unit 202 and memory 204. Depending on the exact configuration and type of computing device 200, memory 204 may be volatile (such as RAM), non-volatile (such as ROM, flash memory, etc.), or some combination of the two. This most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Such computer storage media includes volatile and nonvolatile, removable and non-removable media implemented in any method or technology for storage of information such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which can be used to store the desired information and which can be accessed by device 200 and processor 202. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. These devices, either individually or in combination can form a user interface. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing device 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
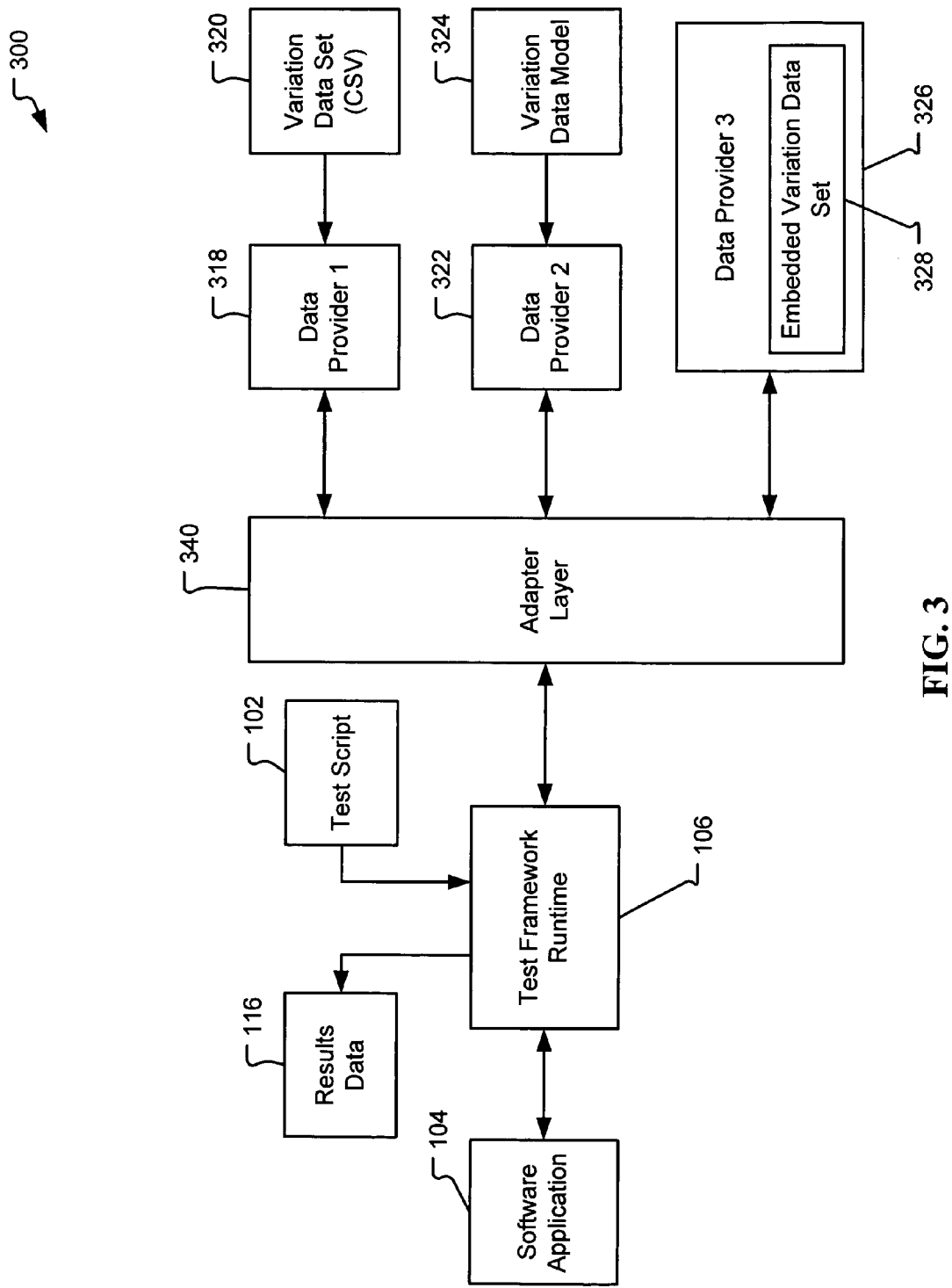
FIG. 3 illustrates an alternative computing architecture in accordance with an embodiment of the present invention.

Before turning to the more detailed embodiments in FIG. 3, the concept of test scope should be presented. In developing the test framework of the present invention, a data-driven model of software applications was developed that divided data used by a software application into 4 levels, referred to herein as scopes, based on how the data is used by the software application. The four scopes of data in the data-driven model of the present invention are "Global Scope," "Suite Scope," "Class Scope" and "Method Scope." In general, data in each scope are defined as follows:

Global. Data at the global level is visible at all levels. It represents the fundamental data used by the operating system to configure the software application. Global data is set as part of the initial configuration of the software application. Depending on the embodiment, global data may or may not be changed by the testing runtime 106.

Suite. Data at the suite level is visible to all classes in a given software application. Suite data may be accessed by any class or method of a software application and, thus, the effects of changing suite data may affect the operation of many different functions of the software application. The testing runtime 106 provides this data, if it is necessary for a test.

Class. Data at the class level is visible to all methods in a particular class, and is also used in initializing class fields and properties during configuration. The testing runtime 106 provides this data, if it is necessary for a test.

Method. Data at the method level is visible only to the specific method of a class. The testing runtime 106 provides this data, if it is necessary for a test.

Using the above concept of data scope, variations can be created to test different functionalities within a software application, regardless of whether the functionality is implemented at the suite, class or method level within the application's code. In embodiments of the present invention, any one variation data provider can be used to generate variations of any one scope.

The concept of data scope is important when implementing test scripts that call multiple variation data providers to ensure that the proper iteration sequence is performed. The concept of scope allows the system to determine which variations to perform first and in what sequence to ensure that all possible combinations are evaluated automatically. For every iteration of an outer scope, all inner scope variations are executed. For example, if you write a test script calling a variation data provider that had 3 variations of a class level parameter and a second variation data provider with a method level parameter of that class that had 5 variations, the method would be executed 15 times. In this way you can combine multiple variations at different scopes to create more complex test variations.

For example, a test script may identify a variation data provider that creates variations at the suite scope level and identify a second data provider that creates variations at the method level. Each of these variation data providers provides data and iterations to their specific scope. In this example, the test will automatically be run for as many iterations as the Suite scope variation data provider dictates (say for all the files in a list). For each one of these suite scope iterations, the method will be run for as many iterations as specified by its scope specific variation data provider (say style templates to apply). Thus with a simple test that opens a file (file names being suite scope data) and iteratively applies the specified set of templates (each template being a different method scope datum), the tester can easily add data to either dimension (file name or style template) without ever making a code change to the test itself.

The following is an example of a variation created from three nested variations with different scope. Variation data can be associated with any given scope. This means that there is a limit of 4 levels for variations. In this case a maximum level variation can look like this:

Global Scope Variation:
Verdana
Times New Roman
Arial
   Suite Scope Variation:
   Italic
   Bold
   Underline
      Class Scope Variation:
      Black
      Red
      Blue
         Method Scope Variation:
         Size 10
         Size 12
         Size 14
         Size 24

If specified, embodiments of the present invention will use the scope order to execute given test with supplied variation data. This means for each item in a higher scope, the adapter layer will iterate on the items in the lower scope as long as the data is available. In the end, the adapter layer will have generated variations with all possible combinations of supplied values as a result of the scope behavior. In this example it will run 108 times (3×3×3×4).

Another benefit of the data-driven variation system of the present invention is that a variation data provider might get its data from a static file, a database, a directory on a path (e.g., using a path name such as C:\tests\public), in essence anyway it wants to without any changes to the framework or test. Furthermore, these variations may be created and applied after a test script has been written.

It is possible to call multiple variation data providers in a test script that are defined for the same scope. In one embodiment, only one variation data provider is necessary for each scope. This variation data provider is able to interpret the data within a data set in order to perform iterations on one or more parameters within the scope.

For example a variation data set file may contain the following:

| Column A | Column B | Column C | Column D | Column E |
|---|---|---|---|---|
| Iteration 1 | Verdana | Bold | Red | Size 10 |
| Iteration 2 | Verdana | Italic | Red | Size 12 |
| Iteration 3 | Arial | Bold | Red | Size 14 |

If so chosen the entire dataset can be applied on the method level, i.e. in one scope. It will however be treated as a 3 rows of data and the variation data provider will read each row in per each execution of the method. That is, even though there are four parameters to be varied, all four will be varied each in each variation. Thus, the first variation will use as values Verdana, Bold, Red, Size 10 and the second variation will be Verdana, Italic Red, Size 12. It will not produce variation combinations of Columns as would be possible had each column been defined as a data set for a variation of a different scope.

FIG. 3 illustrates an alternative computing architecture 300 in accordance with an embodiment of the present invention. The computer architecture 300 shown in FIG. 3 includes the test script 102, the software application 104 to be tested identified by the test script 102, the integrated test framework runtime 106, and the results data store 116. Except as described below, these architectural elements operate as described above with reference to FIG. 1.

The embodiment shown in FIG. 3 includes an adapter layer 340 between the test framework runtime 106 and the data providers 318, 322, and 326. The adapter layer 340 mediates between the runtime 106 and the data providers 318, 322, and 326. Although the adapter layer 340 is shown as a separate component of the system, in alternative implementations the adapter layer 340 does not exist as a specific, independent component, but rather describes functions that are performed by one or more of the other components to facilitate the overall interoperation of the system 300. Thus, although for convenience the following discussion refers to the adapter layer 340 as a separate component, the discussion is equally applicable to an embodiment where the functions of the adapter layer 340 are handled by other components.

The adapter layer 340 performs three basic functions, supplying variations to the runtime 106 from the variation data providers 318, 322, 326, reconfiguring the software application 104 and determining and retrieving the next variation from the appropriate variation data provider. In this last capacity, the adapter layer 340 controls the order of iterations of the variation data providers based on the scope of the parameters being varied. Thus, the adapter layer 340 tracks the scope of each variation data provider and contains the logic to ensure the proper iteration sequence is followed according to scope.

As mentioned above, the adapter layer 340 is responsible for ensuring that the software application 104 is returned to the initial configuration after each variation is tested by the runtime 106 and before the next variation is provided to the runtime 106. This is referred to as the act of "reverting" the most recent variation. In some cases in which an error has been encountered during a test of a variation, reverting may require a significant reconfiguration and even a reinitialization of the software application. Thus, different reverting processes may be performed depending on what results were obtained by the runtime 106 during the last test. This requires that the runtime 106 communication some information concerning the results of the test to the adapter layer 340. Alternatively, the adapter layer 340 may monitor the results data directly.

FIG. 3 illustrates an embodiment in which three variation data providers 318, 322, 326 are identified in the test script 102. Each variation data providers 318, 322, 326 is associated with a different variation data set 320, 324, 326, each one being a different type of variation data set to illustrate the possible configurations of the test architecture. Data provider 1 318 is associated with a variation data set 320 that is a CSV file as dictated by the information in the test script 102. Thus, when generating variations for the runtime 106, data provider 1 318 iteratively retrieves data from the data set 320. Data provider 2 322 is associated a validation data set 324 that is actually an executable data model 324. The data model 324, instead of being a list of values, is an executable object that generates a value based on an internal algorithm. Data provider 3 326 is a data provider that has its data set 328 embedded within it. Embedded data sets 328 result when the values of the data set 328 are enumerated within the test script 102 itself.

FIGS. 4a, 4b and 4c together illustrate an exemplary test script 400 written in the XML markup language. The test script 400 illustrates one embodiment of how variation data providers of different scopes may be identified in a test script and associated with a corresponding variation data set. The exemplary test script 400, upon execution by the runtime, will result in the instantiation of two variation data providers: one class scope variation data provider associated with two class scope variation data sets; and one method scope variation data provider. No suite scope variation data providers will be instantiated by the exemplary script 400.

This test script 400 is simply data for the runtime. It loads it and applies all the data in it (i.e. calls Apply on all the top-level DataProvider objects). The test script 400 shows that there is a single top-level node: TestSuiteData. This node contains a collection of TestSuites of which there is only one in this example. The TestSuite in turn has a collection of TestClasses it should run. The order in the file is also the order in which they should be run. Again, in this example there is only one TestClass. The TestClass has two data providers: the first is the DataSet variation and the second is the collection of methods to be executed. Again these are in the order they should be executed. Since the DataSet variation is a direct child off of the TestClass it is at class scope. If this data provider were a direct child of the TestSuite it would be at suite scope. The TestMethod collection has one test method specified in this example. Finally the test method has a single data provider, which is the method level DataSet variation.

Different scopes and variations are illustrated in the test script 400. The test element's scopes are identified by the entries "<TestClass . . . " (identifying an element of the class scope) and "<TestMethod . . . " (identifying an element of the method scope). A class scope variation is illustrated starting at the entry <DataProvider Description="" AssemblyQualifiedName ="MS.Internal.Test.Automation.Office.Runtime.Variations.VariationDataSet, . . . "> and ending at the entry "</DataProvider>" on the last line shown in FIG. 4*a*. A method scope variation is also illustrated starting with the entry (on FIG. 4*b*) of "<DataProvider Description="" AssemblyQualifiedName="MS.Internal.Test. Automation. Office. Runtime. Variations. Variation Da taSet, . . . "> and ending at the entry "</DataProvider>" on the last line shown in FIG. 4*b*. The variations are all encapsulated as DataProviders so the engine doesn't have to distinguish. In addition, the TestMethodData for the class that defines which methods to run is also a DataProvider.

In FIG. 4*a*, the first two lines identify the xml version used for the test script. The entry on line 3—"<DataProviders>"—indicates that the description that immediately follows identifies a data provider. Indeed, line 4 is the data provider identifier for the suite scope data provider class: MS.Internal.Test.Automation.Office.Runtime.TestSuiteData. This is followed by several entries that configure the suite scope of the target software. However, the suite scope data provider identified here is not a variation data provider. Rather, it identifies a suite scope data provider that supplies the suite scope data necessary to configure the target software for the test.

The second entry of "<DataProviders>" occurs on line 8. The following entry identifies the class scope data provider class: MS.Internal.Test.Automation.Office.Runtime.—TestClassData. Similar to the suite scope data provider entry, this entry identifies a data provider that provides the class level data necessary to configure the target software application for the test.

After the class scope data provider entry is a "<Test Class . . . " entry that alerts the runtime that tests with class scope variations will be run and identifies a runtime class of objects—"MS.Internal.Test.Automation.Office.Tests.IntegrationTest" to be instantiated by the runtime during execution.

The next entries, from line 13 to the last entry in FIG. 4*a*, identify a class scope variation data provider and associates a variation data set with it. Lines 15 and 16 together indicate that the class scope variation data provider is identified as the file MyDataSet.xml which a member of the variation data provider class "MS.Internal.Test.Automation.Office.Runtime.Variations.—VariationDataSet". This information allows the runtime to create the variation data provider by instantiating the class and loading into the instance the information in the MyDataSet.xml file. The class scope validation data provider is identified as having an embedded data set of the class and named MyDataSet.xml. The first validation data set entry also identifies to the system that serial iteration should be used when iterating over this data set in the parameter "Iterator: Serial" within the first data set entry.

In FIG. 4*b*, line 6 to the end of the FIG. is the method scope variation. FIG. 4*c* primarily contains the closing entries as required in C# programming.

The following is a summary of how the test script 400 is executed by the test framework:

1. The Runtime is initialized by the test framework (e.g. an EXE).
2. The test framework tells the Runtime to load the data file. There can be more than one and they don't have to be structured the same. Some could merely set other data.
3. The Runtime loads the data file and enumerates all the DataProviders calling Apply. In this case that causes a single TestSuite to be added to the Runtime data store.
4. The Runtime enumerates the collection of TestSuites in its data store. In this case one.
5. The Runtime tells the TestSuite to apply its data. In this case this adds a single TestClass to the suite scope.
6. The Runtime asks the TestSuite for any TestClasses. The suite returns one.
7. The Runtime asks the TestClass to apply its data. In this case this causes the class-level data set variation to write data into the class scope and adds a single TestMethod.
8. The Runtime asks the TestClass for any TestMethods. The class returns one.
9. The Runtime asks the TestMethod to apply its data. In this case this causes the method-level data set variation to write data into the method scope.
10. The Runtime invokes the method.

FIGS. 5*a* and 5*b* illustrate an exemplary template of operations or test method (FIG. 5*a*) and corresponding data set (FIG. 5*b*). FIG. 5*a* shows an example that doesn't do anything but log what values are passed by a variation data provider. It is the variation equivalent of 'Hello World'.

As shown, the data set in FIG. 5*b* shows that in iteration 1, the value of x is 24 and the value of y is "Ivory Tower". Two additional iterations are also defined.

FIG. 5*c* illustrates the abridged output generated by executing the template of operations shown in FIG. 5*a* using the data set in FIG. 5*b*. In the output, the XML for the setup and teardown of the XML output file are omitted. The output shows the results of running the template of operations and logs the variations identified in the data set. Thus, the output for the first iteration is shown in the first output followed by the output of the subsequent iterations. In this way, the tester generates multiple outputs when executing the template of operations [TestMethod] using a variation data set.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 6A:
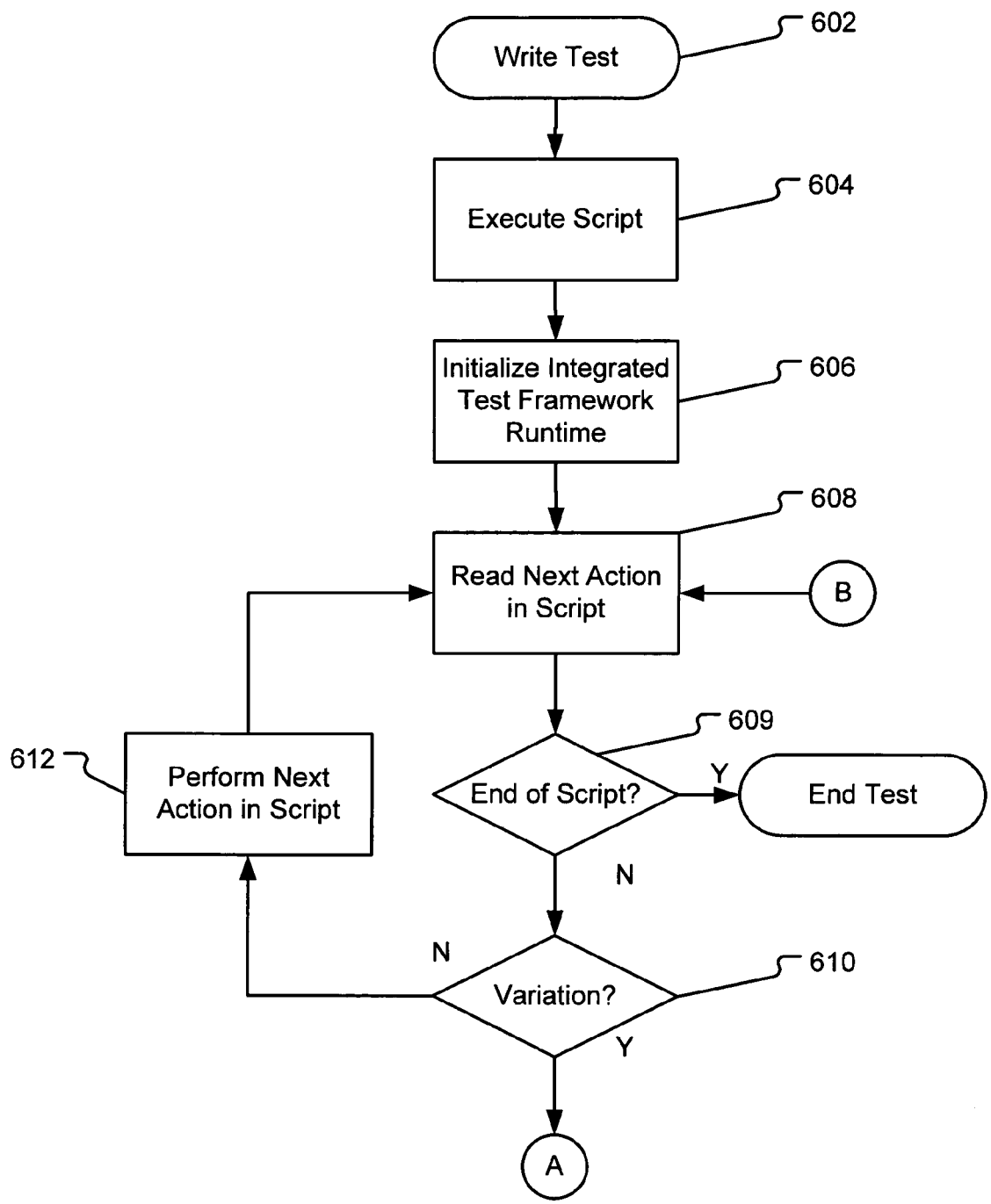
FIGS. 6a and 6b illustrate the operation flow for testing a software application in accordance with an embodiment of the present invention.
Figure 6B:
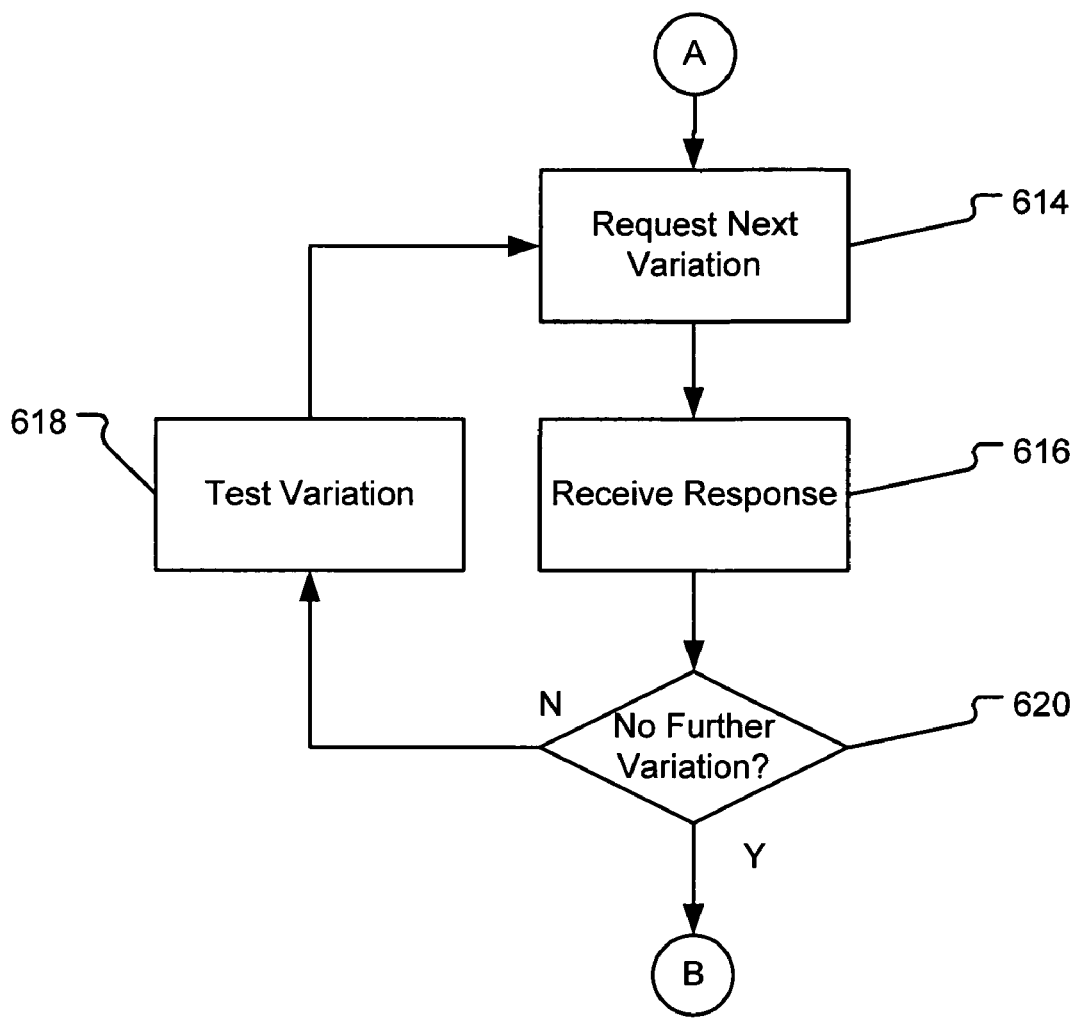

FIGS. 6*a* and 6*b* illustrate the operation flow for testing a software application in accordance with an embodiment of the present invention. In an embodiment, the software application 104 is tested using an integrated test framework runtime 106. The flow starts with the development of a test by a software tester in a draft test operation 602. The draft test operation 602 includes determining a set of scenarios to be tested and the initial starting point of the test (initial configuration of the software application at the beginning of the test). From that determination, the tester creates the test script 102 and the template of operations to be performed by the target software application 104, such as that illustrated in FIG. 5*a*.

The template is incorporated into a variation data provider definition file to be used by the runtime, along with the variation data provider class, to instantiate the variation data provider. The template has at least one parameter that when provided with different values results in the creation of different variations to be tested. In addition, the tester also creates a variation data set such as that illustrated in FIG. 5b that contains the values associated with the parameter in the template.

After the test script, variation data provider definition file and variation data provider data set have been created, an execute test script operation 604 is performed to run the test script. As described above, the test script includes one or more commands to execute the integrated test framework runtime, for example commands that cause the instantiation of an object of the integrated test framework class. In addition, the test script directs the runtime to instantiate at least one variation data provider object and associate that object with a variation data set. If there are multiple variation data sets of the same scope, the test script also defines what iteration method, serial, parallel, or a custom iteration definition, is to be used when iterating through the variations.

In response to the execute script operation 604, the integrated test framework runtime is executed in an initialize operation 606. This operation 606 may involve instantiating an integrated test framework object or otherwise running a test manager program.

In an embodiment, the initialize operation 606 may also include initializing the target software application, such as running the software application and setting it up in an initial configuration as directed by the test script. In an alternative embodiment, the initialization of the software application may occur as part of the test scenario as part of the perform script actions operation 608.

The integrated test framework object may inspect the test script to determine what variation data provider or providers are called for by the test script as part of the initialize operation 606. The identified variation data providers are then configured and instantiated. If an adapter layer 340 is used, then the adapter layer is instantiated at this time. In an embodiment, the adapter layer is instantiated whenever a variation data provider is instantiated. In another embodiment, the functions of the adapter layer are implemented in the variation data provider and the adapter layer does not exist as a separately instantiated object.

In addition, as part of the initialize operation 606, the test script may be statically evaluated to determine how many variations would result if the test script were executed as written. If the number of variations is greater than some predetermined threshold, an error is returned to the tester to prevent the tester from accidentally tying up testing resources for long periods of time with a poorly thought out test. In an alternate embodiment, the authoring tool used to draft the test script in the draft test operation 602 may perform this function.

Next, the specific commands in the test script are carried out. Each command in the script is read in turn in a read operation 608 until a determination operation 609 determines that there are no remaining commands to be performed and terminates the testing. For each command that is read in read operation 608, a determination operation 610 is performed by the testing runtime. If the command does not require a variation to be tested, the actions are performed, executed, or otherwise caused to be performed, by the runtime in a perform action operation 612.

If the determination operation 610 determines that a command requires that a variation is to be tested, control is transferred to the adapter layer as shown in FIG. 6b, or for embodiments without an adapter layer, the applicable variation data provider. For simplicity, the balance of this discussion will refer to the embodiment of FIG. 3 that implements an adapter layer regardless of the number of variation data providers required for the testing. The reader will understand that the discussion equally applies to embodiments in which the adapter layer functionality is implemented within the variation data providers or within the testing runtime.

In an embodiment, the control is transferred when the testing runtime sends its first request to the adapter layer for a variation in request next variation operation 614. By passing the control it is meant that until the adapter layer indicates that all variations have been performed and that there are no more variations to test, the testing runtime performs essentially no other function than to request and receive configuration instructions and variations from the adapter layer and implement these by reconfiguring the software application and causing the software application to perform the variation, while recording the results of the software application's performance. At the end of each variation, i.e., when the software application has completed the operations of the variation, the testing runtime will issue another request to the adapter layer for the next variation. The process is then repeated until the adapter layer returns a "no further variation" indication in response to the testing runtime's request for a variation.

Thus, after requesting the next variation in the request next variation operation 614, the testing runtime synchronously waits until it receives a response from the adapter layer in receive response operation 616. The response may be either a revert command and a variation or a message indicating that there are no further variations to be tested. The testing runtime then evaluates the response in a third determination operation 620 to determine which of the two possibilities was in the response. If a no further variation message is received, then the control reverts back to the testing runtime and the testing runtime performs the read operation 608 on the next command in the script.

If the response from the adapter layer is a revert command and a new variation to test, the testing runtime reconfigures the software application based on the configuration information in the response and then causes the software application to perform the variation in the test variation operation 618. During the variation testing, the testing runtime also may translate the information and variations received by the adapter layer to create commands appropriate to the software. Alternatively, the adapter layer may be designed to provide such information and variations in a form that the testing runtime can simply pass through to the software application's automation. During the test variation operation 618, the testing runtime also manages the collection of data related to the software application's performance. For example, if the software application throws an error, such an error may be collected and stored in a test results data file. Successful performance may also be recorded. In addition, information about the variation may be recorded as well to assist the tester in associating the results data with the actual variation.

In an alternative embodiment, the adapter layer may respond with a revert command and a variation as separate actions. In this alternative embodiment, the testing runtime receives a revert command without a variation, carries out the revert command and then again requests the next variation from the adapter layer. This embodiment allows the adapter layer to ensure that the software application is reconfigured before sending the next variation. It also allows the adapter layer to separately reset the configuration even if there are no further variations. Such an embodiment is useful if a configuration change is necessary between variations or, indeed, as part of a variation.

Figure 7:
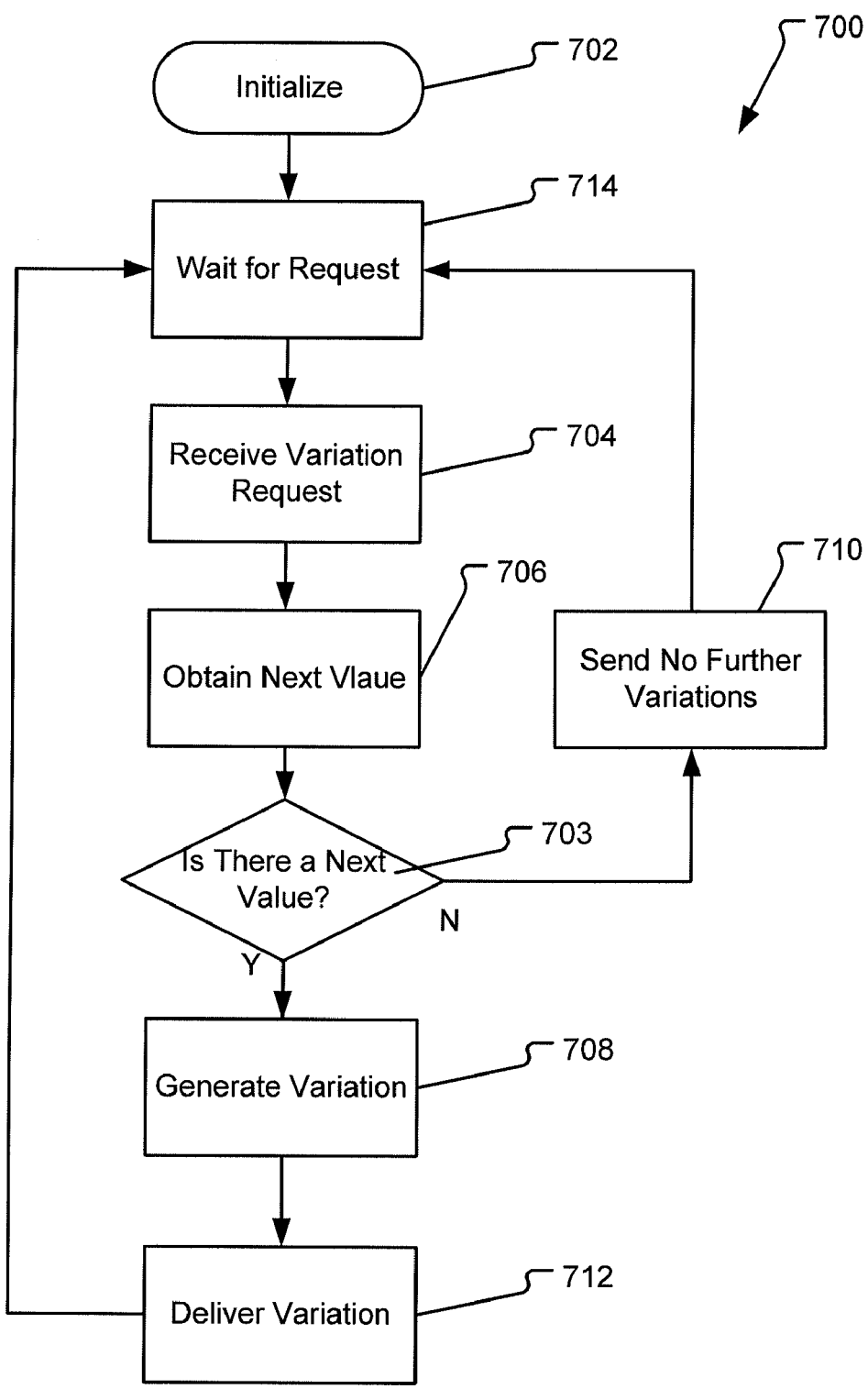
FIG. 7 illustrates an exemplary operational flow of a variation data provider in accordance with the FIG. 3 embodiment of the present invention.

FIG. 7 illustrates an exemplary operational flow of a variation data provider in accordance with the FIG. 3 embodiment of the present invention. First, the variation data provider is instantiated by the testing runtime in response to an initial analysis of the test script in initialization operation 702. In one embodiment, in which the test script includes a description of the template set of operations and the one or more parameters to vary in the template to create the variation, initialization 702 includes instantiating a variation data provider object from a generic variation data provider class and passing the template as part of the instantiation of the object.

In an alternative embodiment, a variation data provider definition file containing the template was previously created during the script writing process. The testing runtime then during initialization 702 instantiates an object of the variation data provider class using that definition file to create the variation data provider object.

Initialization 702 may also include transferring an identifier of a validation data set from which the validation data provider is to derive the values for use in creating the variations. Such an identifier could be a location and file name or some other identifier which the validation data set can interpret. The variation data provider receives a request from the adapter layer for a next variation in a receive request operation 702. Alternatively, the runtime could cause the validation data set to be embedded in the variation data provider and no external variation data set may be required.

After initialization, the variation data provider waits until the first request is received from the adapter layer in receive operation 704. In receive operation 704, the request may take the form of a generic provide next variation request or may include additional information such as provide variation number 1. In a preferred embodiment, a generic request for next variation is used.

In response to the request, an obtain next value operation 706 is performed by the variation data provider. This may require the variation data provider to access a previously identified remote variation data set file or may simply require accessing an embedded value in the variation data provider. The variation data provider tracks its progress through a data set so that no variation is performed twice and the obtain operation 706 always obtains the next value in the data set. In an alternative embodiment, a variation data provider may maintain a history of what values have been used. This history is then consulted in the obtain operation 706 to make sure that no value is obtained twice, that all values are used sequentially as requests are received and that an iteration sequence is followed.

In some embodiments, the iteration sequence may be designated during the initialization of the variation data provider. Examples iteration sequences are serial, parallel and combination. If only one parameter to be varied is contained in template, the only iteration sequences applicable are serial or random. A serial iteration sequence requires the variation data provider to serially go through each value starting with a first value and ending with a last value in the data set. Random may be implemented to randomly check all values, but causing the variation data provider to keep track until each value has been used only once. Alternatively, the random iteration sequence may be truly random and the variation may be caused to cease after some number of predetermined variations has been produced.

If there is no next value as determined by a decision operation 703, then the variation data provider returns a "no further variations" response to the adapter layer in a send notification operation 710. In response, the adapter may subsequently pass the same or a similar message to the testing runtime, or institute a second round of variation requests if there is are two variation data providers specified in the test script for generating a nested variation, i.e., two nested variations of different scopes being testing with one script as will be discussed in greater detail below. After end operation 710, the variation data provider goes back into a waiting mode in wait for next request operation 714 waiting for additional requests from the adapter layer, as will occur in the case of nested variations of different scope.

If there is a next value, after the value is obtained, the variation data provider uses the template, which may include a set of operations such as a) open file named testfile.doc; b) save file as [parameter]; and c) close file or a single operation a) open file named [parameter], to generate a variation including an set of operations that can be executed by the software application in a generate variation operation 708. The variation, then, is the template with the next value substituted for the parameter.

After generation, the variation is returned to the adapter layer in a deliver variation operation 712. The variation may be in a form transmittable directly through the adapter layer to the runtime without modification or it may need to be translated or otherwise formatted before transmittal to the testing runtime or the software application.

After sending the variation, the variation data provider goes into a waiting mode in the wait for next request operation 714.

Note that in this embodiment, neither the runtime nor the adapter layer has any knowledge of the template, the variation history, or the values or structures variation data set. Thus, they may be generic with respect to these elements and a tester need only change values in a data or a template to change complete change the test being performed. Likewise, the variation data provider need not be aware of any other variation data providers creating variations on different scopes. This functionality is maintained by the adapter layer and abstracted from the data providers themselves. Thus variation data providers can be easily standardized and reused in different combinations without worry of interference between one provider and another. Similarly, since the adapter layer is in charge of reverting the variation by reconfiguring the software application after each variation, the tester is assured that each test result for each variation is valid and not corrupted by the variation run before.

Although the invention has been described in language specific to computer structural features, methodological acts and by computer readable media, it is to be understood that the invention defined in the appended claims is not necessarily limited to the specific structures, acts or media described. As an example, additional levels of scope may be used to categorize data to be iterated over based on the programming model used by the software application being tested. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A system for testing a software application comprising:
a processor;
a testing runtime executing on the processor, the testing runtime directing the software application to perform operations based on a test definition and storing results related to performance of operations of the software application;
at least one variation data provider identified by the test definition and executing on the processor, each variation data provider generating a plurality of variations for a predetermined scope from a template and a plurality of values associated with a parameter, the template being a set of operations including the parameter, wherein each variation uses a different one of the plurality of values for the parameter, and wherein the variation data provider supplies the plurality of variations to the testing runtime and the scope of each of the plurality of variations is identified, the scope being used by the system to determine a sequence to run the variations in to ensure that all possible combinations are automatically evaluated.

2. The system of claim 1, wherein the test definition is a test script identifying the software application, the variation data provider and a variation data set containing the plurality of values associated with the parameter.

3. The system of claim 1 further comprising:
a variation data set containing the plurality of values associated with the parameter.

4. The system of claim 1 wherein the template is a set of operations including a first parameter and a second parameter and the plurality of values includes first values associated with the first parameter and second values associated with the second parameter, the test definition further comprising:
a parallel indication to the variation data provider to iterate in parallel through the first values and second values to generate the plurality of variations.

5. The system of claim 1 wherein the template is a set of operations including a first parameter and a second parameter and the plurality of values includes first values associated with the first parameter and second values associated with the second parameter, the test definition further comprising:
a serial indication to the variation data provider to iterate in series through the first values and second values to generate the plurality of variations.

6. The system of claim 1 further comprising:
a variation data set executing on the processor generating the plurality of values associated with the parameter and supplying the values to the variation data provider in response to get next value requests from the variation data provider.

7. The system of claim 3 wherein the variation data set is embedded in the test definition and supplied to the variation data provider by the runtime.

8. The system of claim 1 further comprising:
an adapter layer, executing on the processor, coupling the testing runtime and the variation data provider and causing the runtime to configure the software application to an initial state prior to delivering each variation to the testing runtime.

9. A computer storage medium having computer-executable instructions for performing a method comprising:
a) initializing software on a computer system;
b) initializing a variation data provider;
c) requesting from the variation data provider, a variation comprising at least one operation to be performed by the software, wherein the operation belongs to a predetermined scope of operation, the scope being used in determining the sequence of variations;
d) receiving a variation from the variation data provider, the variation including an initial configuration for the software and a set of one or more operations;
e) configuring the software to the initial configuration;
f) directing the software to perform the set of one or more operations;
g) recording information describing the performance of the software of the set of one or more operations;
h) repeating c) through g) wherein a different variation is received from the variation data provider each time until the variation data provider returns a message indicating there are no further variations.

10. A computer storage medium as defined in claim 9 further comprising computer-executable instructions for performing:
reading a test script identifying the software and the variation data provider to be initialized.

11. A computer storage medium as defined in claim 10 wherein the test script further identifies a variation data set supplying a set of values for varying one or more parameters in a template set of operations in the variation data provider.

12. A computer storage medium as defined in claim 9 wherein the set of one or more operations has a first parameter and the different variations are the set of one or more operation substituting a different value for the first parameter.

13. A computer storage medium as defined in claim 12 wherein the different values for the first parameter are obtained from a variation data set stored in a separate location from the variation data provider.

14. A computer storage medium as defined in claim 12 wherein the different values for the first parameter are obtained from a variation data set embedded in the variation data provider.

15. A computer storage medium having computer-executable instructions for performing a method comprising:
a) initializing software on a computer system;
b) initializing a first variation data provider and a second variation data provider and an adapter layer;
c) identifying the scope of each variation data provider to the adapter layer;
d) requesting from the adapter layer, a variation comprising at least one operation to be performed by the software;
e) receiving a variation from the adapter layer, the variation including an initial configuration for the software and a set of one or more operations, wherein a first value in the set of one or more operations is provided by the first variation data provider and a second value in the set of one or more operations is provided by the second variation data provider;
f) configuring the software to the initial configuration;
g) directing the software to perform the set of one or more operations;
h) recording information describing the performance of the software of the set of one or more operations;
i) repeating d) through h) wherein a different variation is received from the adapter layer each time until the variation data provider returns a message indicating there are no further variations.

16. A computer storage medium as defined in claim 15 wherein the set of one or more operations has a first parameter associated with a first variation data provider and a second parameter associated with a second variation data provider and wherein the different variations are the set of one or more operations substituting a different value for at least one of the first parameter and the second parameter and further comprising computer-executable instructions for performing:

evaluating by the adapter layer, the scope of each variation data provider;

determining, based on the scope, what sequence to vary the values for the at least one of the first parameter and the second parameter; and monitoring the sequence to determine a next variation.

17. A computer storage medium as defined in claim 15 further comprising computer-executable instructions for performing:

reading a test script, the test script identifying the software, the first variation data provider, and the second variation data provider to be initialized and associating a first scope with the first variation data provider and a second scope with the second variation data provider.

18. A computer storage medium having computer-executable instructions for performing a method comprising:

receiving a request for a variation from a testing runtime executing a test script directing the testing of a software application;

delivering to the testing runtime, in response to the request, a revert command, directing the testing runtime to configure the software application to the initial configuration;

storing a template set of operations, the template set of operations including one or more operations to be performed by the software application, at least one operation having a parameter requiring a value;

generating one or more variations based on the template set of operations by obtaining a next value from a variation data set and using the next value as the parameter, each variation relates to a predetermined scope wherein at least two or more scopes are a part of a hierarchical organization, wherein the predetermined scope comprises one of a Global scope, a Suite scope, a Class scope, and a Method scope;

delivering to the testing runtime, in response to the request, the variation to the testing runtime; and executing each variation, wherein for each iteration of a variation related to an outer scope all inner scope variations are executed.

19. A computer storage medium as defined in claim 18 further comprising computer-executable instructions for performing:

storing an identification of the variation data set containing values associated with a parameter and an initial configuration for the software application.

20. A computer storage medium as defined in claim 18 wherein the template set of operations has more than one parameter and the variation data set includes a set of values associated with each parameter and wherein generating a variation further comprises:

determining which value to use for each parameter based on previous variations delivered to the testing runtime, an iteration identifier, and a scope associated with each parameter.

\* \* \* \* \*